United States Patent
Lyons et al.

(10) Patent No.: US 11,769,120 B2
(45) Date of Patent: Sep. 26, 2023

(54) SYSTEMS AND METHODS FOR IMPROVING USER EXPERIENCE DURING DAMAGE APPRAISAL

(71) Applicant: Mitchell International, Inc., San Diego, CA (US)

(72) Inventors: Jennifer Lyons, San Diego, CA (US); Marcel de Neve, San Diego, CA (US); Beau Sullivan, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 129 days.

(21) Appl. No.: 17/121,437

(22) Filed: Dec. 14, 2020

(65) Prior Publication Data
US 2022/0114558 A1    Apr. 14, 2022

Related U.S. Application Data

(60) Provisional application No. 63/091,907, filed on Oct. 14, 2020.

(51) Int. Cl.
*G06Q 10/20*    (2023.01)
*G06Q 30/02*    (2023.01)

(52) U.S. Cl.
CPC ......... *G06Q 10/20* (2013.01); *G06Q 30/0278* (2013.01)

(58) Field of Classification Search
CPC ....... G06Q 10/20; G06Q 30/0278; G06N 3/08
(Continued)

(56) References Cited

U.S. PATENT DOCUMENTS 8,019,629 B1    9/2011    Medina, III et al.
8,160,904 B1    4/2012    Smith
(Continued)

OTHER PUBLICATIONS

Y. Li et al, "Applying Image Analysis to Auto Insurance Triage: A Novel Application," 2007 IEEE 9th Workshop on Multimedia Signal Processing, 2007, pp. 280-283, doi: 10.1109/MMSP.2007.4412872. (Year: 2007).*

(Continued)

*Primary Examiner* — Sarah M Monfeldt
*Assistant Examiner* — John S. Wasaff
(74) *Attorney, Agent, or Firm* — Sheppard Mullin Richter & Hampton LLP

(57) ABSTRACT

Systems and methods are provided for integrating damage evidence with appraisal management system to create a unified user experience for improving a virtual damage appraisal process. The system may display a curated collection of evidence providing an overview of the vehicle and sections of a vehicle damaged during an adverse incident. A user may select a damaged section from a plurality of damaged sections to view damage evidence determined by machine learning algorithms to best reflect the selected damaged section may be displayed. The damage evidence may be displayed concurrently with vehicle part selection and repair line editing functionality in a configurable graphical user interface (GUI) of a virtual appraisal application. Additionally, the system may generate set of recommendations for repairing or replacing the damaged parts in the selected section. The user may add the recommendations to a repair estimate as repair estimate lines.

20 Claims, 11 Drawing Sheets

(58) Field of Classification Search
USPC .......................................................... 705/305
See application file for complete search history.

(56) References Cited

U.S. PATENT DOCUMENTS

| | | | |
|---|---|---|---|
| 8,260,639 | B1 | 9/2012 | Medina, III et al. |
| 8,712,806 | B1 | 4/2014 | Medina, III et al. |
| 9,721,400 | B1 | 8/2017 | Oakes, III et al. |
| 10,339,728 | B1 | 7/2019 | Oakes, III et al. |
| 10,410,439 | B1 | 10/2019 | Gingrich et al. |
| 10,430,886 | B1 * | 10/2019 | Brandmaier ........... G06Q 40/08 |
| 10,497,108 | B1 * | 12/2019 | Knuffman ............. B64C 39/024 |
| 10,510,142 | B1 | 12/2019 | Dohner et al. |
| 10,762,385 | B1 * | 9/2020 | Yang .................... G06V 10/761 |
| 2013/0297353 | A1 * | 11/2013 | Strange ................ G06V 30/412 705/4 |
| 2017/0011468 | A1 * | 1/2017 | King ....................... G06Q 40/08 |
| 2017/0046788 | A1 * | 2/2017 | Macciola ................. G06F 17/40 |
| 2017/0148102 | A1 * | 5/2017 | Franke ............... G06Q 30/0601 |
| 2017/0221110 | A1 * | 8/2017 | Sullivan ............. G06Q 30/0278 |
| 2019/0073641 | A1 * | 3/2019 | Utke ....................... G06V 20/00 |
| 2019/0122069 | A1 * | 4/2019 | Nayyar ................... G06V 20/00 |
| 2019/0213804 | A1 * | 7/2019 | Zhang .................... G06N 3/08 |
| 2020/0118365 | A1 * | 4/2020 | Wang ..................... G06Q 10/20 |
| 2020/0143257 | A1 * | 5/2020 | Neelamana ........... G06F 16/248 |
| 2020/0258057 | A1 * | 8/2020 | Farahat ................. G06Q 10/20 |
| 2020/0334467 | A1 * | 10/2020 | Guo ....................... G06Q 10/06 |
| 2020/0349353 | A1 * | 11/2020 | Guo ........................ G06V 20/20 |
| 2021/0192264 | A1 * | 6/2021 | Li ........................... G06K 9/627 |

OTHER PUBLICATIONS

Patil, K., Kulkarni, M., Sriraman, A., & Karande, S. (Dec. 2017). Deep learning based car damage classification. In 2017 16th IEEE international conference on machine learning and applications (ICMLA) (pp. 50-54). IEEE. (Year: 2017).*

Gupta, A., Chogale, J., Shrivastav, S., & Nikhare, R. (2020). Automatic Car Insurance using Image Analysis. International Research Journal of Engineering and Technology (IRJET), 7(04). (Year: 2020).*

* cited by examiner

SYSTEMS AND METHODS FOR IMPROVING USER EXPERIENCE DURING DAMAGE APPRAISAL

RELATED APPLICATIONS

This application claims the benefit of U.S. Provisional Application No. 63/091,907 filed on Oct. 14, 2020, the contents of which are incorporated herein by reference in its entirety.

TECHNICAL FIELD

The present disclosure is generally related to automobiles. More particularly, the present disclosure is directed to automotive collision repair technology.

BACKGROUND

Damage to a vehicle from a collision accident or otherwise is evaluated by an appraiser in order to assess which parts of the vehicle need to be repaired or replaced. Physical inspection of the vehicle while rendering most accurate appraisal requires the appraiser to be in the same physical location as the damaged vehicle significantly increasing the cost of the appraisal. In order to reduce this cost, in-person appraisal has been replaced with "virtual" appraisal in which the appraiser writes an estimate solely based on reviewing photo and/or video evidence of the damage.

SUMMARY

In accordance with one or more embodiments, various features and functionality can be provided for integrating damage evidence system with appraisal management system to create a unified user experience for improving a virtual damage appraisal process.

In some embodiments, a method may obtain a first command comprising a damaged part selected by the user from a plurality of damaged and non-damaged parts of a vehicle damaged during an adverse incident. The user command may be obtained from a computing device operated by a user. For example, the user may select the damaged part via a graphical user interface (GUI) of an application (e.g., an appraisal management application).

In some embodiments, at least one damage evidence file associated with the damaged part from a set of damage evidence files associated with the vehicle may be identified by an appraisal management computing apparatus in response to the user selected damaged part. For example, the appraisal management computing apparatus may utilize a first machine learning algorithm trained on historic user evidence identification data (e.g., data comprising a plurality of damage evidence files previously associated with corresponding damaged vehicle parts). In some embodiments, the damage evidence file (e.g., an image file, a video file, and a 3D scan file) may include a depiction of the damaged part.

In some embodiments, a recommendation for restoring the damaged part selected by the user may be determined by the appraisal management computing apparatus. For example, the appraisal management computing apparatus may utilize a second machine learning algorithm trained on historic data (e.g., data comprising previously determined repair recommendations for restoring damaged parts). In some embodiments, restoring the damaged part may comprise instructions to repair or replace the part.

In some embodiments, a repair estimate line may be generated based on at least one user input directed to the determined recommendation. For example, user input directed to the determined recommendation may include adding the determined recommendation to a repair estimate, i.e., the repair estimate line added to the estimate may include the determined recommendation. In other embodiments, user input directed to adding the determined recommendation to the repair estimate may also include a modification of the generated recommendation entered by the user via the GUI of the application. In yet other embodiments, the user input directed to the determined recommendation may include rejecting the generated recommendation from being added to the repair estimate.

In some embodiments, the user input directed to the determined recommendation may be used as training data by the second machine learning algorithm during the recommendation determination. For example, the second machine learning algorithm used to determine the recommendation for restoring the damaged part may utilize at least one damage evidence file identified by the appraisal management computing apparatus. In some embodiments, the recommendation determined by the second machine learning algorithm may have a higher likelihood of being accepted by the user.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

Figure 1:
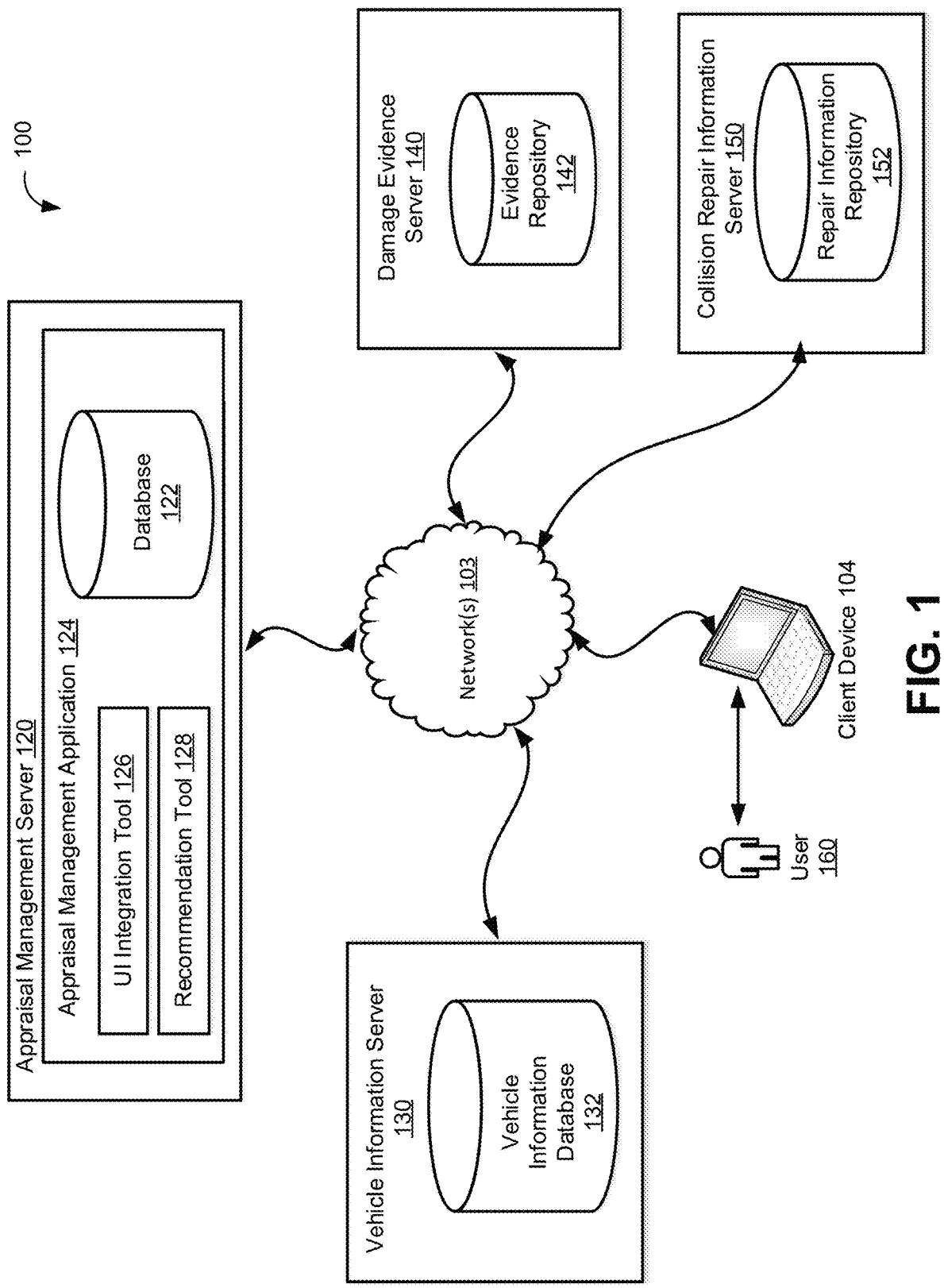
FIG. 1 illustrates example systems and a network environment, according to an implementation of the disclosure.

Described herein are systems and methods for integrating damage evidence system with appraisal management system to create a unified user experience for improving a virtual damage appraisal process. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As alluded to above, virtual damage appraisal systems provide an appraiser with a way to inspect the damage using digital damage evidence without being physically present in the same location as the damaged property. For example, available damage evidence often includes images, videos, 3D renderings, scans, holograms, telematics data, audio recordings, geolocation information, and so on.

Prior to generating a repair estimate, the appraiser has to review available damage evidence. Currently, a user (i.e., the appraiser) has to sift through available evidence which is often presented via a separate software application (e.g., image viewer). Although some appraisal systems allow the user to access all the collected damage evidence, the appraiser must determine which images are most relevant to the damaged part they are evaluating. Further, even if the evidence is provided in the same appraisal system, the sequence in which the images are presented for viewing is not related to appraiser's particular task or workflow. Rather, the images are presented in a sequence based on evidence metadata (e.g., date and time stamp) and are not related to the particular panel or part of the vehicle the appraiser is evaluating. Thus, if the appraiser is required to refer to a particular image on multiple occasions, the appraiser is forced to repeatedly locate a previously identified image or video. Further still, even when the appraiser identifies the relevant evidence, the associated damage and repair data must be obtained by the appraiser by accessing one or more areas within the virtual appraisal application. By virtue of the damage evidence (e.g., images) not being associated with the corresponding part impedes appraiser's workflow and reduces productivity and accuracy during the virtual appraisal process.

By integrating the damage evidence with the appraisal management system, the present embodiments organize, group, and prioritize the damage evidence based on one or more categories including, for example, existence of damage, relevance and/or usefulness for vehicle identification or part disambiguation, relatedness to a panel, component, and/or part, and relatedness to prior damage, quality, duplicate or redundant copy, irrelevant content.

For example, the user may review the evidence (i.e., damage images) simultaneously when viewing the impacted panel. This ensures the user does not have to either locate relevant evidence or find it repeatedly when referring to it during the estimate. Finally, when reviewing recommendations generated by the system, the user may also reference the images making the acceptance or rejection of the recommendation more accurate.

Before describing the technology in detail, it is useful to describe an example environment in which the presently disclosed technology can be implemented. FIG. 1 illustrates one such example environment 100.

Environment

FIG. 1 illustrates an example network environment architecture 100 which provides enhanced data and enhanced data flow in the context of damage appraisal management system, particularly when presenting relevant damage evidence to a graphical user interface ("UI") of the appraisal management system. For example, data flow through the network is streamlined to avoid network congestion, to use fewer computer and network resources and/or to enable the utilization of smaller databases, as will be described in more detail hereinafter. In particular, optimization and prioritization of damage evidence presentation is enabled by one or more components of environment 100 (e.g., the UI integration tool obtains relevant evidence related to a particular damaged panel, recommendation tool generates recommendations to resolve the damage, as will be described further below) resulting in a curated presentation of damage evidence that is optimized for viewing during virtual appraisal of individual vehicle components and parts. This improved presentation of damage evidence supports more accurate and expedient decisions regarding repair or replacement of damaged components, which in turn enables a more accurate appraisal. That is, the appraisal decision is made faster because relevant damage evidence is presented in optimized configuration. Accordingly, environment 100 enables improved damage appraisal process.

In some embodiments, environment 100 may include an appraisal management server 120, a vehicle information server 130, a damage evidence server 140, a collision repair information server 150, a client computing device 104, and a network 103. A user 160 (e.g., an appraiser) may be associated with client computing device 104 as described in detail below. Additionally, environment 100 may include other network devices such as one or more routers and/or switches.

In some embodiments, client computing device 104 may include a variety of electronic computing devices, for example, a smartphone, a tablet, a laptop, a virtual reality device, an augmented reality device, a display, a mobile phone, a computer wearable device, such as smart glasses, or any other head-mounted display device, or a combination of any two or more of these data processing devices, and/or other devices.

Appraisal Management Server

In some embodiments and as will be described in detail further below, appraisal management server 120 may include a processor, a memory, and network communication capabilities. In some embodiments, appraisal management server 120 may be a hardware server. In some implementations, appraisal management server 120 may be provided in a virtualized environment, e.g., appraisal management server 120 may be a virtual machine that is executed on a hardware server that may include one or more other virtual machines. Additionally, in one or more embodiments of this technology, virtual machine(s) running on appraisal management server 120 may be managed or supervised by a hypervisor. Appraisal management server 120 may be communicatively coupled to a network 103.

Figure 2:
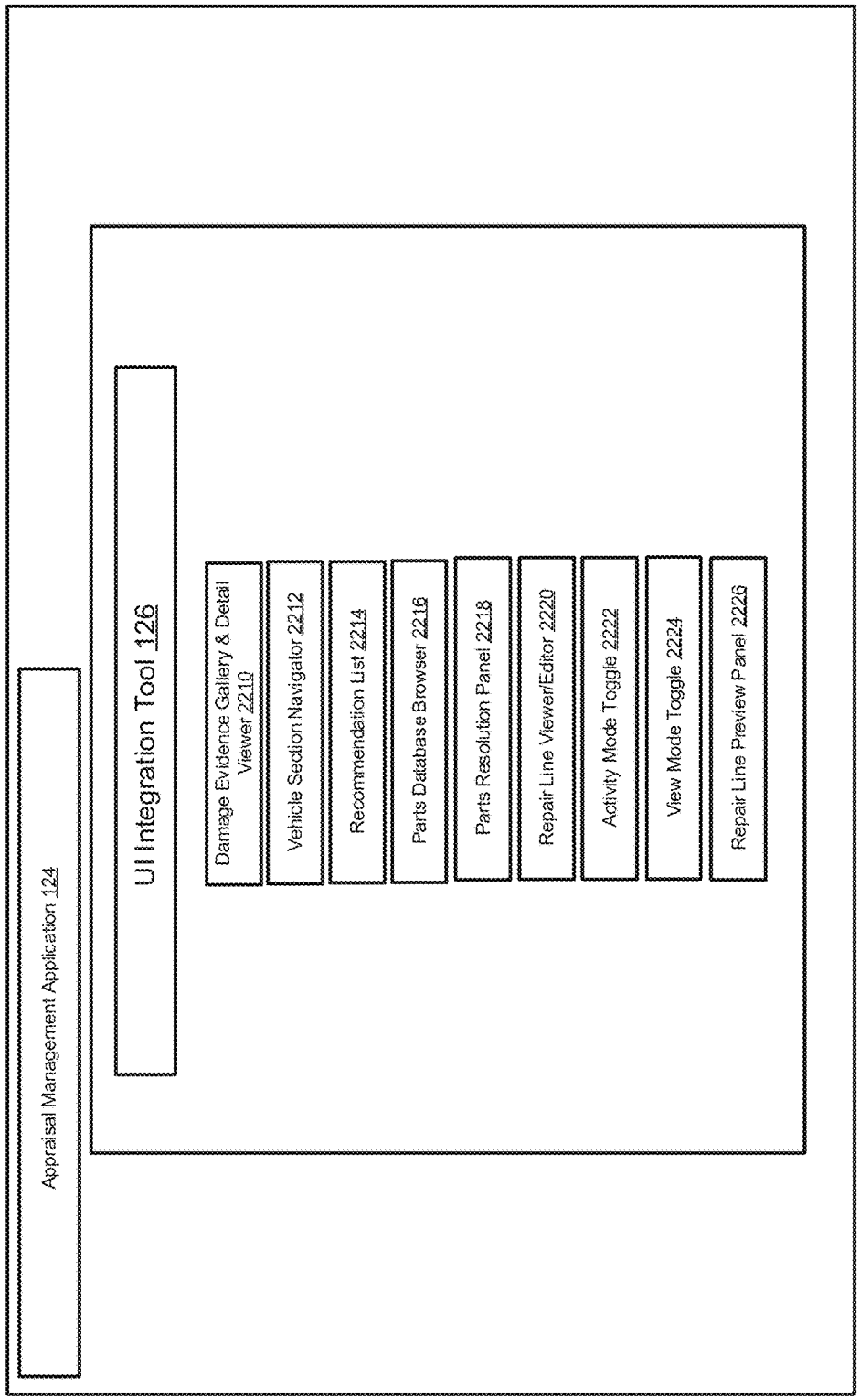
FIG. 2 illustrates example functions of the user interface of an appraisal management system, according to an implementation of the disclosure.

In some embodiments, the memory of appraisal management server 120 may store application(s) that can include executable instructions that, when executed by appraisal management server 120, cause appraisal management server 120 to perform actions or other operations as described and illustrated below with reference to FIGS. 2, 3A-3B. For example, appraisal management server 120 may include an appraisal management application 124.

In some embodiments, appraisal management application 124 may be configured to provide the user with an ability to conduct a virtual appraisal. For example, and as will be described in detail further, the user may utilize a graphical user interface of appraisal management application 124 to select a particular vehicle being appraised, review the evidence associated with the damage and review system-generated recommendations, which the user can then choose to accept, modify, or remove. In some embodiments, appraisal management application 124 may be a distributed application implemented on one or more client devices 104 as a client appraisal management application. In some embodiments, appraisal management application 124 may be implemented using a combination of hardware and software. In some embodiments, appraisal management application 124 may be a server application, a server module of a client-server application, or a distributed application.

In some embodiments, appraisal management application 124 may include a user interface ("UI") integration tool 126 and a recommendation tool 128.

UI integration tool 126 may be configured to utilize one or more trained neural network models or other machine learning algorithms and the damage evidence information, including metadata, user historical data related to user selection, prioritization, and organization (e.g., assignment of order to an image in a set of images, assignment of category to an image), and other similar evidence to provide relevant damage evidence in a curated fashion thus further optimizing the virtual appraisal process.

Recommendation tool 128 may be configured to utilize one or more trained neural network models or other machine learning algorithms and the damage evidence information, historical damage evidence information, vehicle information, repair information, sensor data, feedback data, and other such data, to generate recommendations for which action should be taken for a particular damaged component (e.g., repair or replace). In some embodiments, distributed UI integration tool 126 and recommendation tool 128 may each be implemented using a combination of hardware and software. In some embodiments, UI integration tool 126 and recommendation tool 128 may each be a server application, a server module of a client-server application, or a distributed application.

The application(s) can be implemented as modules, engines, or components of other application(s). Further, the application(s) can be implemented as operating system extensions, modules, plugins, or the like.

Even further, the application(s) may be operative locally on the device or in a cloud-based computing environment. The application(s) can be executed within or as virtual machine(s) or virtual server(s) that may be managed in a cloud-based computing environment. Also, the application (s), and even the repair management computing device itself, may be located in virtual server(s) running in a cloud-based computing environment rather than being tied to one or more specific physical network computing devices. Also, the application(s) may be running in one or more virtual machines (VMs) executing on the repair management computing device.

In some embodiments, appraisal management server 120 may also include a datastore 122. For example, datastore 122 may include a plurality of databases configured to store data related to the presentation of the damage evidence, estimate recommendations for performing the actions related to repair or replacement of vehicle panels or parts, In other embodiments, datastore 122 may include training database configured to store training data related to user preferences in past appraisals (e.g., user actions related to viewing particular damage evidence, such as prioritization, organization of evidence, use of toggle modes or switching between activity mode to view mode, and so on) used by UI integration tool 126 to train the trained neural network module. Similarly, datastore 122 may include a training database configured to store training data related to user actions associated with reviewing, accepting, editing, or deleting recommendations during past appraisals. This historic data of user actions and interactions may be used by recommendation tool 128 to train the trained neural network module. In yet other embodiments, databases may include one or more database configured to store machine learning data, and/or other information used by appraisal management server 120.

In some embodiments, appraisal management server 120 can be a standalone device or integrated with one or more other devices or apparatuses, such as one or more of the storage devices, for example. For example, appraisal management server 120 may include or be hosted by one of the storage devices, and other arrangements are also possible.

In some embodiments, appraisal management server 120 may transmit and receive information to and from client computing device 104, vehicle information server 130, damage evidenced server 140, collision repair information server 150, and/or other servers via network 103. For example, a communication interface of the appraisal management server 120 may be configured to operatively couple and communicate between client computing device 104, vehicle information server 130, damage evidence server 140, collision repair information server 150, which are all coupled together by the communication network(s) 103.

API

In some embodiments, appraisal management system 124 may include a method for exchanging data between appraisal management system 124 and various systems utilized in the collision repair, billing, and automotive claims processes described herein, including, for example, vehicle information server 130, damage evidence server 140, and collision repair information server 150). In some embodiments, the implementation of the systems and methods described herein may include the publication of a Software Developers Kit (SDK) and/or an Application Programming Interface (API) that will allow for application developers and data providers to implement Interfaces among the various components of the systems. The API data exchange may be accomplished using Standardized Transactions (e.g., CIECA BMS transactions, etc.) or may be by using other published or custom data formats.

For example, API may be integrated with OEM and other third-party repair procedure data providers to allow user access to repair procedures via the appraisal management application 124 during the course of repairs, as described herein. This could include both repair procedure data from the vehicle manufacturer (e.g., Toyota, Honda, Ford, G/M, etc.) and third-party sources (e.g., I-CAR, ETI, AllData, etc.). This integration of the appraisal management application 124 with the damage evidence and the repair recommendation generation allows the appraiser to easily make a determination about a particular damaged part by reviewing relevant evidence which is made readily available. Finally, rather than the appraiser having to come out to physically inspect the vehicle, the appraiser can access online data in the appraisal management system and quickly provide an appraisal estimate.

As another example, integration may be provided via API with other collision information systems, which may or may not be in use at the collision repair facility, including the repair facility's estimating system and other systems in use by the repair facility for management. In some embodiments, API may be utilized for data exchange with vehicle OEMs, insurers' claims management systems, parts manufacturers and suppliers, and other entities involved in the automotive collision and claims processes.

Vehicle Info Server

In some embodiments, vehicle information server 130 may be configured to store and manage vehicle information associated with a damaged vehicle. For example, vehicle information may include vehicle identification information, such as Vehicle Identification Number (VIN), make, model, and optional modifications (e.g., sub-model and trim level), including installed vehicle components based on the option and trim packages included on the specific vehicle, date and place of manufacture, and similar information related to a damaged vehicle.

The vehicle information server 130 may include any type of computing device that can be used to interface with the appraisal management server 120, damage evidence server 140, collision repair information server 150, and client computing device 104. For example, vehicle information server 130 may include a processor, a memory, and a communication interface, which are coupled together by a bus or other communication link, although other numbers and/or types of network devices could be used. In some embodiments, vehicle information server 130 may also include a database 132. For example, database 132 may include a plurality of databases configured to store content data associated with vehicle information, as indicated above. Vehicle information server 130 may run interface applications, such as standard web browsers or standalone client applications, which may provide an interface to communicate with the repair management computing device via the communication network(s). In some embodiments, vehicle information server 130 may further include a display device, such as a display screen or touchscreen, and/or an input device, such as a keyboard, for example.

Damage Evidence Server

In some embodiments, damage evidence server 140 may be configured to store and manage data related to the damage sustained by a vehicle during an adverse collision event (e.g., an accident). Damage evidence server 140 may include processor(s), a memory, and a communication interface, which are coupled together by a bus or other communication link, although other numbers and/or types of network devices could be used. In some embodiments, damage evidence server 140 may also include an evidence repository 142. For example, evidence repository 142 may include a plurality of databases configured to store content data associated with the damage the vehicle sustained in an adverse event. Damage evidence data may include images, videos, 3D renderings, scans, holograms, telematics data, audio recordings, and any data identifying vehicle damage. More specifically, damage evidence data associated with a particular damaged panel may be analyzed (e.g., using one or more computer vision methods, telemetry data, and so on) to determine one or more damage evidence records that best depict a particular damaged panel from a plurality of records related to the panel. As will be described in detail herein, the best evidence determined to represent a particular panel may be presented to the user during the virtual appraisal process. Further, damage evidence data associated with a particular damaged panel may be analyzed to determine one or more recommendations of which operations must be performed to fix the damage.

In some embodiments, the damage evidence data may include historic data comprising of damage records related to a plurality of adverse events associated with a plurality of vehicles, thereby providing the data related to prior appraisals and repair estimates. For example, a plurality of past estimates that have been authored may be analyzed by identifying estimate lines that may be commonly found together.

The damage evidence generated during an appraisal may thus be a result of applying machine learning algorithms to historic damage data to determine one or more recommendations of which operations must be performed to fix the damage. In some embodiments, damage evidence may include metadata identifying information relating to, for example, the date/time the evidence was obtained, vehicle information, adverse event information (e.g., location, type of collision sustained, etc.), the damaged component or part depicted, view of the vehicle from which the evidence was obtained, carrier information, and/or any other information related to the damage, the adverse event and/or the vehicle. Additionally, the metadata may include panel and damage related metadata generated by the machine learning algorithm during the recommendation generation process.

In some embodiments, damage evidence server 140 may include any type of computing device that can be used to interface with the appraisal management server 120 to efficiently optimize the collision repair process, as will be described further below. For example, damage evidence server 140 may include a processor, a memory, and a communication interface, which are coupled together by a bus or other communication link, although other numbers and/or types of network devices could be used.

In some embodiments, damage evidence server 140 may run interface applications, such as standard web browsers or standalone client applications, which may provide an interface to communicate with the appraisal management server 120 via the communication network(s) 103. In some embodiments, damage evidence server 140 may further include a display device, such as a display screen or touchscreen, and/or an input device, such as a keyboard, for example.

In some embodiments, the memory of damage evidence server 140 may store application(s) that can include executable instructions that, when executed by damage evidence server 140, cause damage evidence server 140 to perform actions or other operations.

Collision Repair Info Server

In some embodiments, collision repair information server 150 may be configured to store and manage data related to information associated with collision repair. Collision repair information server 150 may include processor(s), a memory, and a communication interface, which are coupled together by a bus or other communication link, although other numbers and/or types of network devices could be used. In some embodiments, collision repair information server 150 may also include a database 152. For example, repair information repository 152 may include a plurality databases configured to store content data associated with repair (e.g., workflow repair procedures, including textual information, images, videos, with and without an audio guide, and/or animations, including 3D animations) demonstrating how to perform repairs of various parts for a variety of different types and models of vehicles. The repair data may include part numbers, wiring diagrams, standard repair times, and other repair procedure information. Additionally, repair information repository 152 may include sensor calibration documentation data, and other similar information. Additionally, database 152 of collision repair information server 150 may include information related to repair standards (e.g., safety standards or manufacturer standards). The content data associated with repair procedures may be encoded and arranged in accordance with a file type specification comprising a particular set of rules, each type of file (text, image, video, audio, and so on) having an associated set of rules. In some embodiment repair information may include repair procedures generated by automakers (OEMs). Alternatively, repair information may include repair procedure information and/or part information generated by a proprietary program or obtained from another third-party source (e.g., insurance carrier).

In some embodiments, collision repair information server 150 may include any type of computing device that can be used to interface with the appraisal management server 120 to efficiently optimize the collision repair process. For example, collision repair information server 150 may include a processor, a memory, and a communication interface, which are coupled together by a bus or other communication link, although other numbers and/or types of network devices could be used.

In some embodiments, collision repair information server 150 may run interface applications, such as standard web browsers or standalone client applications, which may provide an interface to communicate with the appraisal management server 120 via the communication network(s) 103. In some embodiments, collision repair information server 150 may further include a display device, such as a display screen or touchscreen, and/or an input device, such as a keyboard, for example.

In some embodiments, the memory of collision repair information server 150 may store application(s) that can include executable instructions that, when executed by collision repair information server 150, cause collision repair information server 150 to perform actions or other operations.

UI Integration Tool

As alluded to above, UI integration tool 126 of appraisal management application 124 may be configured to provide the user with the view of the damage evidence, including vehicle information, diagnostic and other data to optimize the virtual appraisal process. In essence, tool 126 may be configured to present damage data during specific phases of the appraisal process in a way that results faster and more accurate appraisal. In some embodiments each phase may be associated with a set of workflow rules and represented as individual screens within the UI of application 124 (e.g., "explore view," "write view," and "review view" illustrated in FIGS. 4A-4C). Further, each of "explore," "write," and "review" phases may be associated with its own set of workflow rules and present damage data in a way that best suits particular phase of the appraisal process and its associated workflow. For example, the "explore" workflow may include damage data that enables the appraiser to perform a virtual vehicle "walkaround" by viewing damage evidence from all available angles of the vehicle to ensure the appraiser is familiar with the vehicle and the damage.

Accordingly, the display of damage evidence in the UI of appraisal management application 124 may be configured to present evidence based on its relative value curated, such that only relevant evidence content is presented to the user at a time. In stark contrast, a user of a conventional virtual appraisal application may be provided with all the damage evidence available without any regard to its value position to the appraiser. However, because each particular image or video may only contribute limited information to the damage being appraised and/or may not be optimal when appraising a particular panel (i.e., each image has, the user of such conventional technology is forced to manually sift through hundreds of images to select suitable evidence for each damaged panel or part. These selections are often made by the user outside of the system (e.g., though a paper note). Further still, when the user is reviewing images for another panel, they may find an image relevant to one panel associated with another panel. Outside of relying on their memory or a time consuming and cumbersome method of writing evidence information down, the user may not have the ability to reference a particular image they deem as relevant.

By contrast, the damage evidence presented the UI of appraisal management application 124 may be grouped to coincide with particular workflow elements of each phase of the virtual inspection and appraisal process. Finally, tool 126 may take into consideration user choices or selections with respect to what relevant evidence the user would like to see, further contributing to enabling an optimized presentation of damage evidence.

For example, relevant evidence that is being presented to the viewer may be based on a phase of the appraisal process (e.g., explore, write, and review). In other embodiments, the relevant evidence may be presented based on a type of panel the user selects.

Further still, the layout of the evidence data presented to the user may be based on viewing controls within the UI of appraisal management application 124 selected by the user. For example, as illustrated in FIG. 2, appraisal management application 124 operating on appraisal management server (e.g., appraisal management server 120 illustrated in FIG. 1) may include UI integration tool 126 configured to execute one or more functions related to integration, optimization and curated presentation of damage evidence within the appraisal management application 124, as alluded to above. By virtue of utilizing UI integration tool 126, results in flexible and configurable appraisal management application 124, capable of supporting a wide variety of hardware devices, software configurations, work environments and customer workflows. In particular, this may be achieved by UI integration tool 126 utilizing one or more modular components configured to optimize user experience during an appraisal process. For example, the modular components of UI integration tool 126 may include an evidence gallery and detail viewer component 2210, a vehicle section navigator component 2201, a recommendation list component 2214, a parts database browser component 2216, a part resolution panel component 2218, a repair line viewer and editor component 2220, an activity mode toggle component 2222, a view mode toggle component 2224, a repair line preview panel 2226, and/or other similar components.

The components of UI integration tool 126 may provide damage evidence organization, categorization, grouping, filtering, and sorting. In some embodiments, the sorting may include ability to sort the evidence based on a number of criteria. For example, sorting criteria may include detection or presence of damage, usefulness for vehicle identification or part disambiguation, selection of the vehicle depicted, prior damage (related or unrelated), panels and/or parts identified in the evidence, and other such criteria.

In some embodiments, evidence may be filtered to remove duplicates, redundancies, low quality, useless content. Additionally, evidence can be sorted to group similar evidence files or images and prioritize the display of the most useful, meaningful and relevant content.

In some embodiments, UI integration tool 126 may determine which damage evidence files (e.g., images) are most relevant to the appraisal process. The relevance may be determined based on the extent of damage, visibility of damage, angle of view, and other similar parameters. In some embodiments, computer vision may be used to identify damaged panels and determine evidence relevance. In essence, UI tool 126 may determine a likelihood that a particular image may be relevant during the appraisal process. An image with a higher likelihood will likely be more useful when determining relevance and vice versa. The likelihood of relevance may be relative to other images of the same damage. For example, if the likelihood of relevance is assigned a numeric value, then images with a value below a certain threshold may be discarded as not-relevant. In some embodiments, such numeric value or a threshold may be provided by the user or preset by the system. Thus, images with a determined likelihood of relevance exceeding the threshold may only be selected as relevant. Finally, the system may be enhanced with Artificial Intelligence (AI) to make an automatic determination whether the damage depicted in the image is relevant to the appraisal process.

Referring back to FIG. 1, as described earlier, appraisal management application 124 may establish a connection to vehicle information database 132 located on vehicle information server 130 and retrieve vehicle information associated with a particular vehicle being appraised (e.g., vehicle year/make/model, the detailed list of installed vehicle components based on the option and trim packages included on the specific vehicle, and so on). Next, appraisal management application 124 may establish a connection to evidence repository 142 located on damage evidence information server 140 and retrieve damage evidence information associated with a particular vehicle being appraised.

UI integration tool 126 may be configured to use the damage evidence related to the vehicle being appraised obtained from evidence repository 154 in order to determine one or more sets of images, videos (i.e., damage evidence) that best depict damage of each damaged component or panel as it is being viewed form each vehicle side or vantage point/angle. In other words, UI integration tool 126 may provide relevant damage evidence to the user based on one or more user commands indicating a selection for viewing a particular part or panel.

UI integration tool 126 may employ one or more machine learning models comprising one or more trained models or other machine learning assignment algorithms for or other instructions to determine most relevant damage evidence for presenting to the user during a virtual appraisal. UI integration tool 126 may use a machine learning model which may be any machine learning model, algorithm, or AI technique, capable of the functions described herein. The machine learning model of UI integration tool 126 may determine damage evidence priority based on metadata associated with the damage evidence, may be used to prioritize individual images for a particular user command or view. For example, evidence that best depicts a left passenger door may be determined as being more likely to be relevant during damage appraisal when compared to all available images of the left side of the vehicle when showcasing "left" side of the vehicle. Further, the image illustrating a front bumper may be determined as being more likely to be relevant during damage appraisal when compared to all available images of the front bumper based on image resolution, quality, saturation, and other image characteristics.

Other artificial intelligence techniques may be used instead of, or in addition to, using a machine learning model. By virtue of utilizing a machine learning approach enhances the presentation of damaged evidence during the appraisal process described herein. In particular, by using machine learning model, allows the system to provide users the damage evidence that is likely best suited to perform virtual appraisal of the damage.

In some embodiments, the machine learning training model, including data acquisition, processing, cleaning, and other steps of the machine learning training and execution process may be used. Training the machine learning model may include supervised learning, unsupervised learning, or combinations thereof.

In some embodiments, one or more data categories may be used during the training state. For example, user interaction with the images during previous virtual appraisals may be applied as inputs to the machine learning model. For example, a user may categorize and/or tag evidence data by determining which particular piece of evidence (e.g., image) best represents damaged panel or view. Similarly, metadata and image quality characteristics may be used. During the training stage, the machine learning model may store the values related to the decisions made during the training stage in a training database of datastore 122, as illustrated in FIG. 1.

In some embodiments, the machine learning training model may obtain feedback data from user computing device 104 on the identified subset of the provided plurality of damage evidence files during a virtual appraisal process. The feedback data may include actions taken by the user directed to modifying the determined selection. For example, a user may be provided with a way to re-order and re-categorize evidence manually based on their personal preference. This may cause the user to select another evidence file to represent a particular panel or modifying the category of to which the evidence file has been assigned. The obtained feedback data may be used by UI integration tool 126 to further train or otherwise refine the machine learning model. In some embodiments, user modifications may take precedence over the initial organization provided by the machine learning model, while the data associated with user decisions may be used to train the machine learning model to improve the model performance. Accordingly, priority of the evidence may be determined based on machine learning model while also being continuously reinforced by user feedback.

Additionally, by virtue of providing users with an ability to manually re-organize the evidence results in the system being implemented without the use of the machine learning model. Further, this non-machine learning enabled use of the appraisal system allows users to reap the benefits of the UI layout and synchrony between the evidence and other workflows with or without the machine learning.

Recommendation Tool

As described earlier, recommendation tool 128 of appraisal management application 124 may be configured to provide the user with recommendations associated with the damage indicated in the image of a user-selected part or panel. Appraisal management application 124 may establish a connection to repair information repository 152 located on collision repair information server 150 and retrieve repair information evidence information associated with a particular damaged panel, part, and/or component of the vehicle being appraised. In some embodiments, recommendation tool 128 may process repair procedure data received from the automotive manufacturers, car information systems, proprietary applications, and so on. In some embodiments, appraisal management system 124 may utilize one or more tables configured to store data related to repair estimate data. For example, operations code table may be an extension of or addition to a parts/labor code table on the repair shop's management or estimating system, or the operations code table may be a standalone table to support appraisal management system 124.

Recommendation tool 128 may be configured to use the repair collision data related to the damaged part of the vehicle being appraised in order to determine a recommendation how to best address the damage (e.g., repair or replace the part).

Recommendation tool 128 may employ one or more machine learning models comprising one or more trained models or other machine learning assignment algorithms for or other instructions to determine recommendations most likely to be followed by the user appraising the vehicle. Recommendation tool 128 may use a machine learning model which may be any machine learning model, algorithm, or an Artificial Intelligence (AI) technique, capable of the functions described herein. The machine learning model of recommendation tool 128 may determine whether to recommend repairing, replacing, or performing another action to address the damage associated with the part.

Other artificial intelligence techniques may be used instead of, or in addition to, using a machine learning model. By virtue of utilizing a machine learning approach enhances the appraisal process described herein. In particular, by using machine learning model, allows the system to provide user the recommendation that is likely best suited to address the damage associated with the vehicle part.

In some embodiments, the machine learning training model, including data acquisition, processing, cleaning, and other steps of the machine learning training and execution process may be used. Training the machine learning model may include supervised learning, unsupervised learning, or combinations thereof.

In some embodiments, one or more data categories may be used during the training state. For example, user response(s) to a recommendation during previous virtual appraisals may be applied as inputs to the machine learning model. For example, data related to user editing a recommendation before adding it to the estimate, user selecting a Reason Code for recommendations that they do not wish to accept, user deleting or modifying and/or removing an estimate line which was added automatically, and or similar user edit functions performed when evaluating the recommendation generated by the system may be employed. During the training stage, the machine learning model may store the values related to the decisions made during the training stage in a training database of datastore 122, as illustrated in FIG. 1.

In some embodiments, the machine learning training model may obtain feedback data from user computing device 104 on the identified subset of the provided plurality of damage evidence files during a virtual appraisal process. The feedback data may include actions taken by the user directed to accepting, rejecting, or modifying recommendation. The obtained feedback data may be used by recommendation tool 128 to further train or otherwise refine the machine learning model.

Method of Use

Figure 3A:
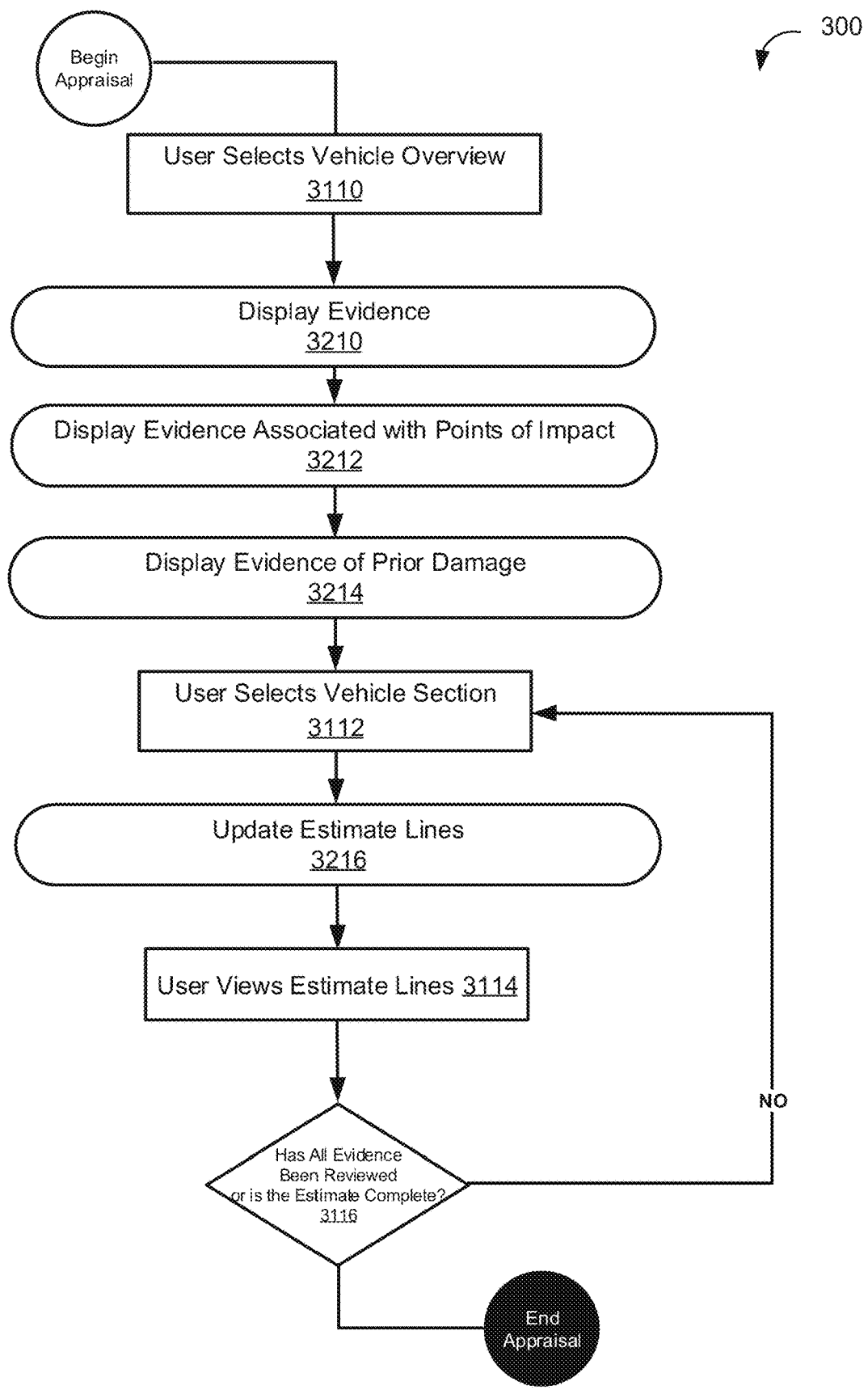
FIGS. 3A-3B illustrate an example user-guided appraisal process, according to an implementation of the disclosure.

FIG. 3A illustrates an example operation of the appraisal management system 124 illustrated in FIG. 1, depicting an example of a basic process of use of the disclosed system for purposes of collision appraisal. In particular, the steps identified inside rectangles indicate the user input, while the steps inside boxes with rounded corner indicate the response may be generated by the appraisal management system.

It should be noted that the disclosed system offers unique advantages over existing systems, processes and methods. For example, the system provides a method to present relevant documentary evidence related to a particular area of damage in an interactive, user friendly display. As alluded to earlier, the relevance of the evidence may be determined by utilizing machine learning algorithms At operation 3110, a user (e.g., an appraiser) may use the appraisal management system to begin the appraisal of collision damage sustained by a vehicle by selecting to receive a vehicle overview. That is, by selecting the vehicle overview, the user will begin to familiarize themselves with the vehicle which they intend to appraise.

At operation 3210, the appraisal management system (via the UI integration tool, as discussed above) may present evidence in the form of relevant images, videos, 3D renderings, and other similar information to provide an overview or a general view of the vehicle. In addition, at operation 3210, the appraisal management system may present vehicle information from the vehicle information database such as Vehicle Identification Number (VIN), make, model, and optional modifications (e.g., sub-model and trim level), date and place of manufacture, and similar information related to a damaged vehicle.

Figure 4A:
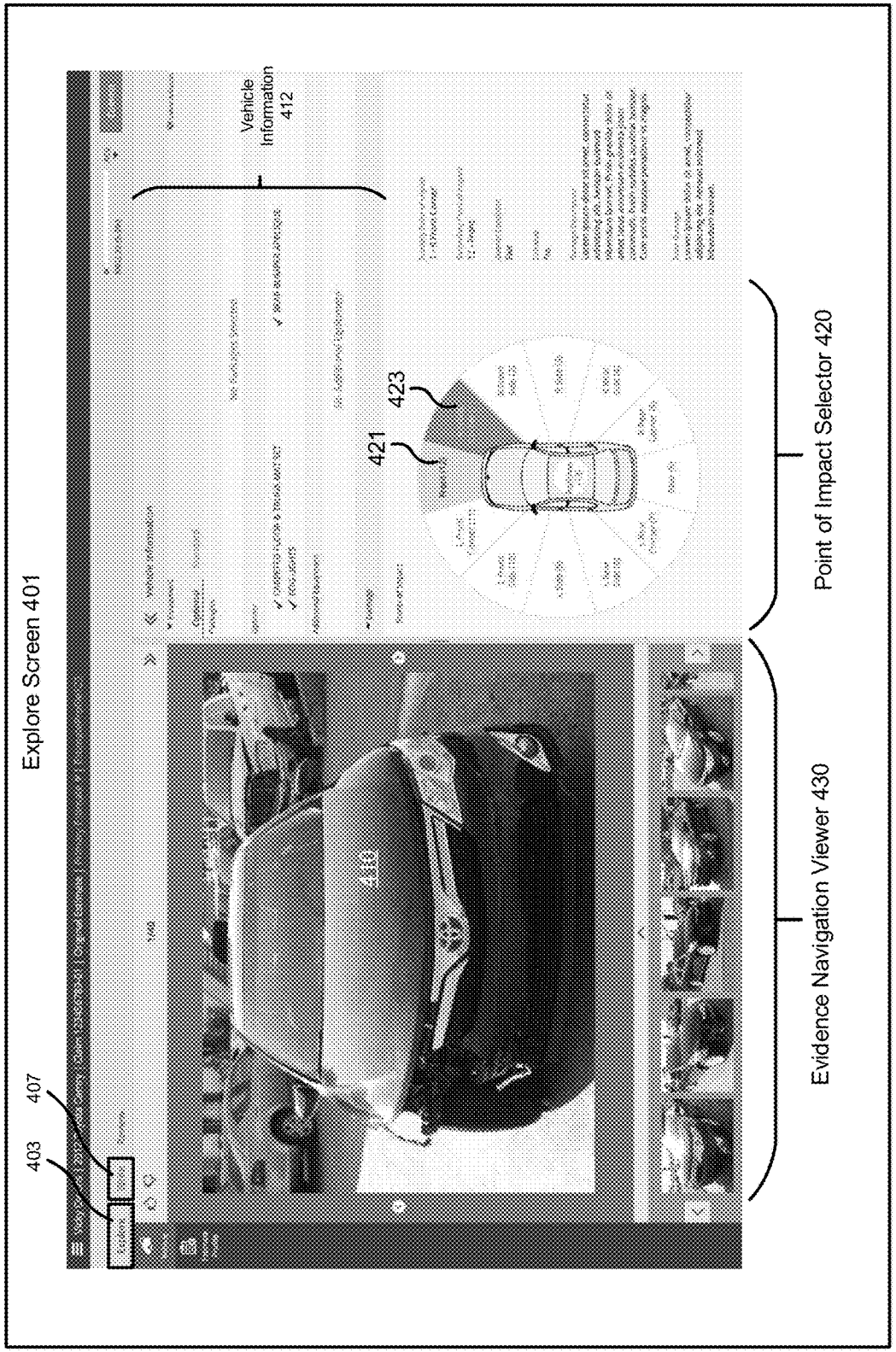
FIGS. 4A-4D illustrate an example user interface of the appraisal management system, according to an implementation of the disclosure.

For example, as illustrated in FIG. 4A, an Explore screen 401 may be presented to the user within the UI of the appraisal management system upon starting the virtual appraisal process. For example, the screen indicator 403 may indicate that the user is currently in the Explore View. The Explore screen 401 may include an Evidence Navigation viewer 430 and a Point of Impact Selector viewer 420. The Evidence Navigation viewer 430 may be configured to present damage evidence comprising files in disparate data formats (e.g., JPEG, MPEG) directly within Evidence Navigation View 430 of Explore screen 401.

In some embodiments, Evidence Navigation View 430 may present damage evidence comprising images and/or videos as thumbnails and provide functional support for browsing, searching, or filtering damage evidence. For example, user may use metadata tags as search terms.

In some embodiments, Point of Impact viewer 420 may indicate to the user which primary section(s) or sub-section(s) of vehicle 410 have been damaged (e.g., front panel, right front corner). A section may include multiple panels. By selecting an individual Point of Impact Section from Point of Impact Selector viewer 420, such as individual Point of Impact Section 421 or 423, causes the system to present a more detailed view configured to provide detailed information about each of the Panels 421 or 423, as further illustrated in FIG. 4B. For example, by selecting Section 421 from Point of Impact Selector viewer 420, the user may view damage evidence determined to best depict the damage of Section 421.

In some embodiments, the UI may include a damage indicator and a filter. For example, the vehicle section navigator may include a visual indicator (e.g., an icon and/or color) to draw attention to damaged impact panels, categories, or parts. By using damage filtering, allows the UI to de-emphasize or hide sections of the vehicle where damage is not found. In some embodiments, the UI visually distinguishes or does not display sections, categories, or parts that have not been damaged.

Referring back to FIG. 3A, at operation 3212, the appraisal management system may present a subset of the evidence records or files identified at operation 3210 by presenting only evidence and information associated with a damaged section selected by the user. The information related to one or more categories within a section may be presented. Further, each damaged category may include a list of labor operations associated with replacing or repairing a particular category within the section.

Figure 4B:
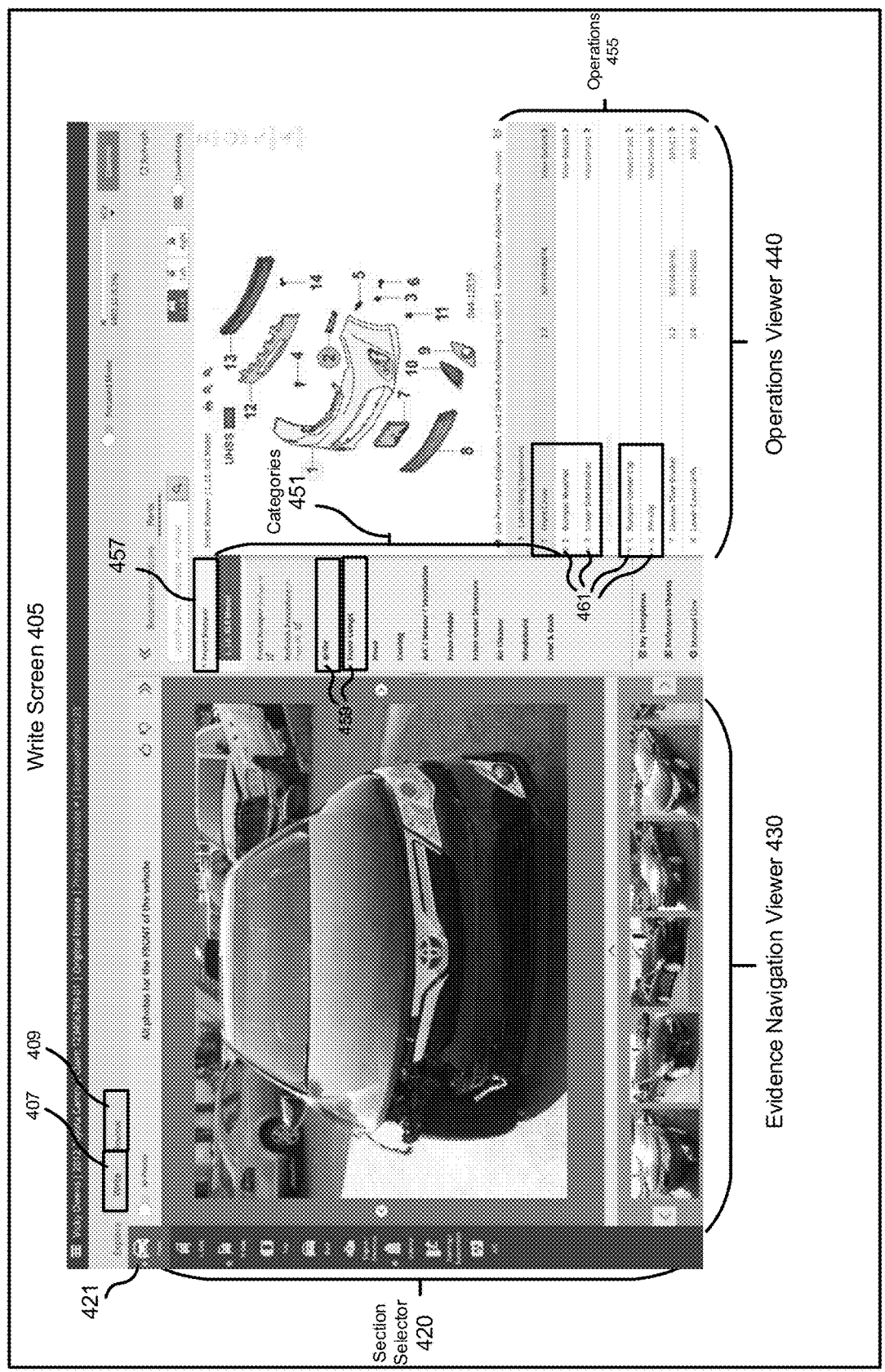

For example, as illustrated in FIG. 4B, a Write Estimate screen 405 may be presented to the user within the UI of appraisal management application 124 upon the user selecting a screen indicator 407 in Explore View screen 403 illustrated in FIG. 4A.

The Write Estimate screen 405 may include evidence navigation viewer 430, as previously described with reference to FIG. 4A. Write Estimate screen 405 represents the phase of the appraisal process during which the appraiser writes an estimate for repairing or replacing a damaged part.

Conventionally, the appraiser would be forced to review all damage evidence provided to the appraiser either via a virtual appraisal platform or an image viewer. Even if the appraiser is using the platform that provides access to the damage evidence, such evidence is usually presented at once without any regard to which phase of the appraisal process the user is in. By contrast, the user performing the appraisal using the present solution is able to seamlessly navigate from one phase of the appraisal process to another, or from one vehicle panel to another, while viewing damage evidence presented by the UI of the appraisal management system.

For example, upon selecting one section 421 from a plurality of available section within Section Selector 420, the user may be presented with categories 451 associated with Panel 421. Individual categories that have been determined to have damage may be marked via an indicator 459. Upon selecting an individual category, the user may be presented with individual operation associated with that category. For example, when selected by the user, a category 457 ("Front Bumper"), may cause individual operations 455 to be presented within operations viewer 440. Additionally, the parts that have been determined to have damage may be marked via an indicator 461.

In some embodiments, upon the user selecting an individual damage evidence from evidence navigation panel 430, a detailed view of the single selected file (e.g., image) is presented. The user may perform various image editing functions to the image, including panning, zooming, flipping, rotating, cropping, inverting, annotating, and/or other editing functions. In some embodiments, the user may have an ability to draw on the images and add text to them. Note, there is a distinction between editing the image file with annotations with the intent of sending to another party is different from highlighting the damage for the user's own purposes, or correcting the damage highlights that the AI may have generated. The latter may be used to train the machine learning algorithm, though the former may not.

In some embodiments, the UI may include a synchronized evidence display resulting in damage evidence for each section of the vehicle being displayed concurrently with the relevant/associated part and editing features. The evidence gallery and the detail viewer and parts database browser may be updated each time a vehicle section is selected using the vehicle selection navigator.

In some embodiments, the UI may include a flexible layout. For example, a layout that allows viewing evidence while simultaneously editing repair recommendation lines. This flexible layout is provided in order to simulate the appraiser being at the vehicle and looking back and forth between the vehicle and computer screen. By utilizing view mode toggle allows appraisers to switch between views in a single click/tap resulting in either the evidence viewer maximized, the repair data being maximized, or an equal (50/50) split between the two. For example, as illustrated in FIG. 2, view mode toggle component 2224, of UI integration tool 126 may provide the user with an ability switch between "Focused Mode" filtering only damaged panels and data.

Referring back to FIG. 3A, at operation 3214, the appraisal management system may present historical evidence of prior damage and diagnostic data associated with the vehicle selected by the user at operation 3110. In some embodiments, only the related prior damage will be displayed alongside the current damage. For example, if the vehicle includes current damage to a right front fender, prior damage found on the rear section of the vehicle may not be displayed.

At operation 3112, the user may select a category associated with section identified at operation 3212. For example, the user may select section 423 (right front corner). Next, the user may select a category 457 associated with the section 421, as illustrated in FIG. 4B.

At operation 3216, the appraisal management system may present one or more recommendations associated with the component selected at operation 3112.

Figure 3B:
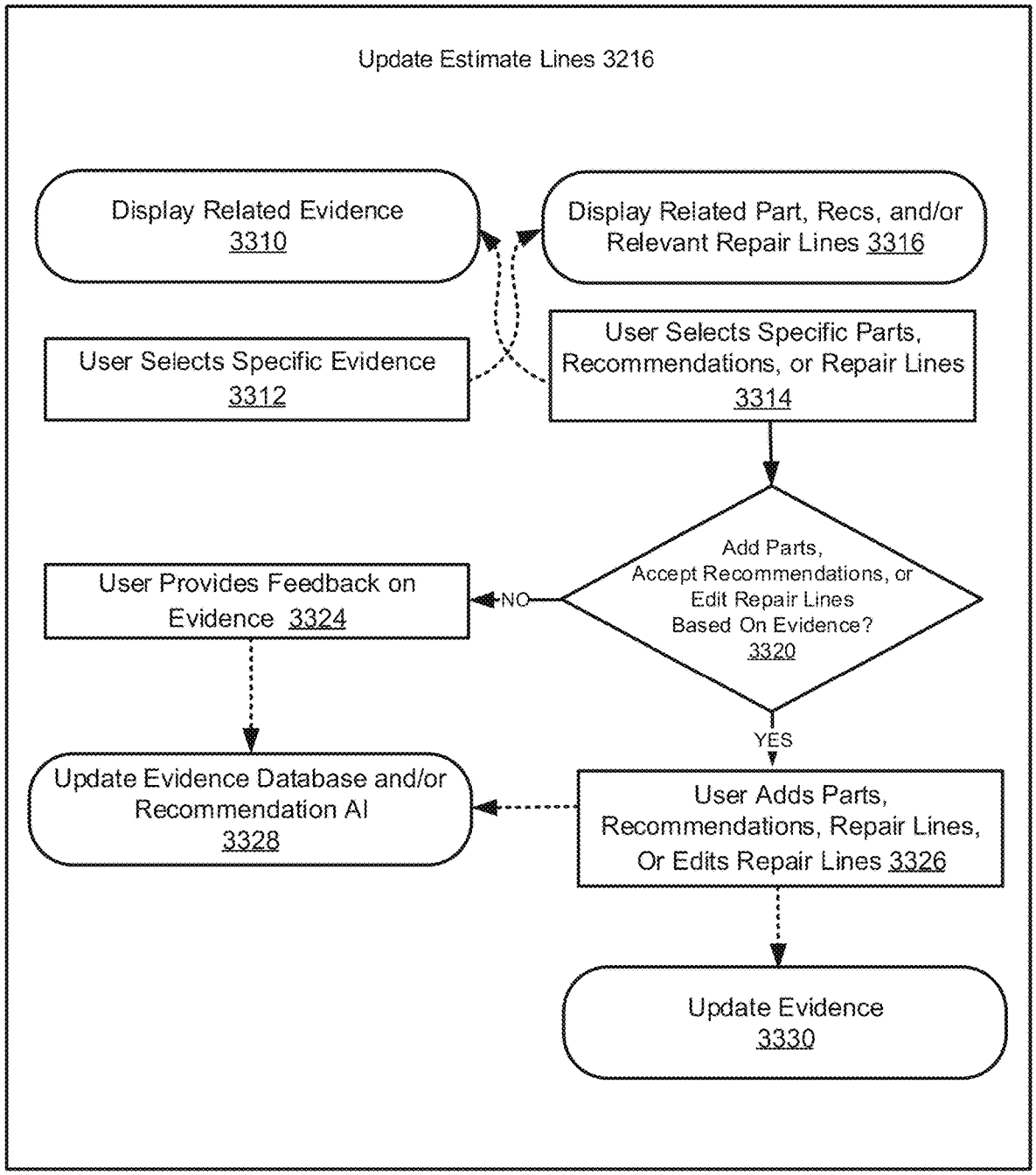

In some embodiments, upon the user selecting a category associated with a section of the vehicle, the appraisal system may perform the steps illustrated in FIG. 3B.

At operation 3312, the user may select an individual evidence record (e.g., an image) from the set of records provided at operation 3210 or 3212. For example, one of the images in the navigation panel 430 illustrated in FIGS. 4A-4B. In response, at operation 3316, the appraisal management system may present one or recommendations associated with the component or section depicted in the image at operation 3312, as illustrated in FIG. 4C.

Figure 4C:
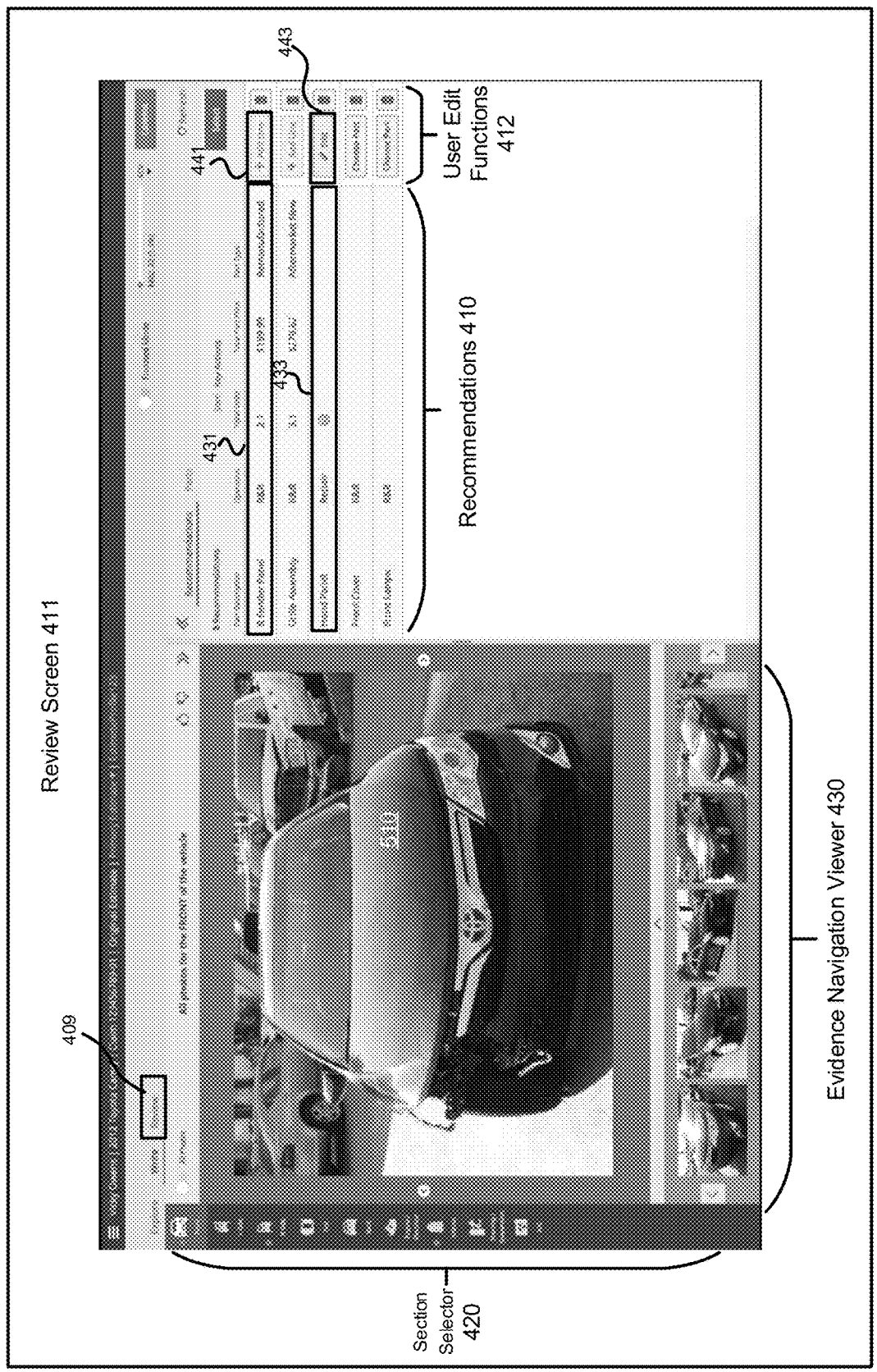
Figure 4D:
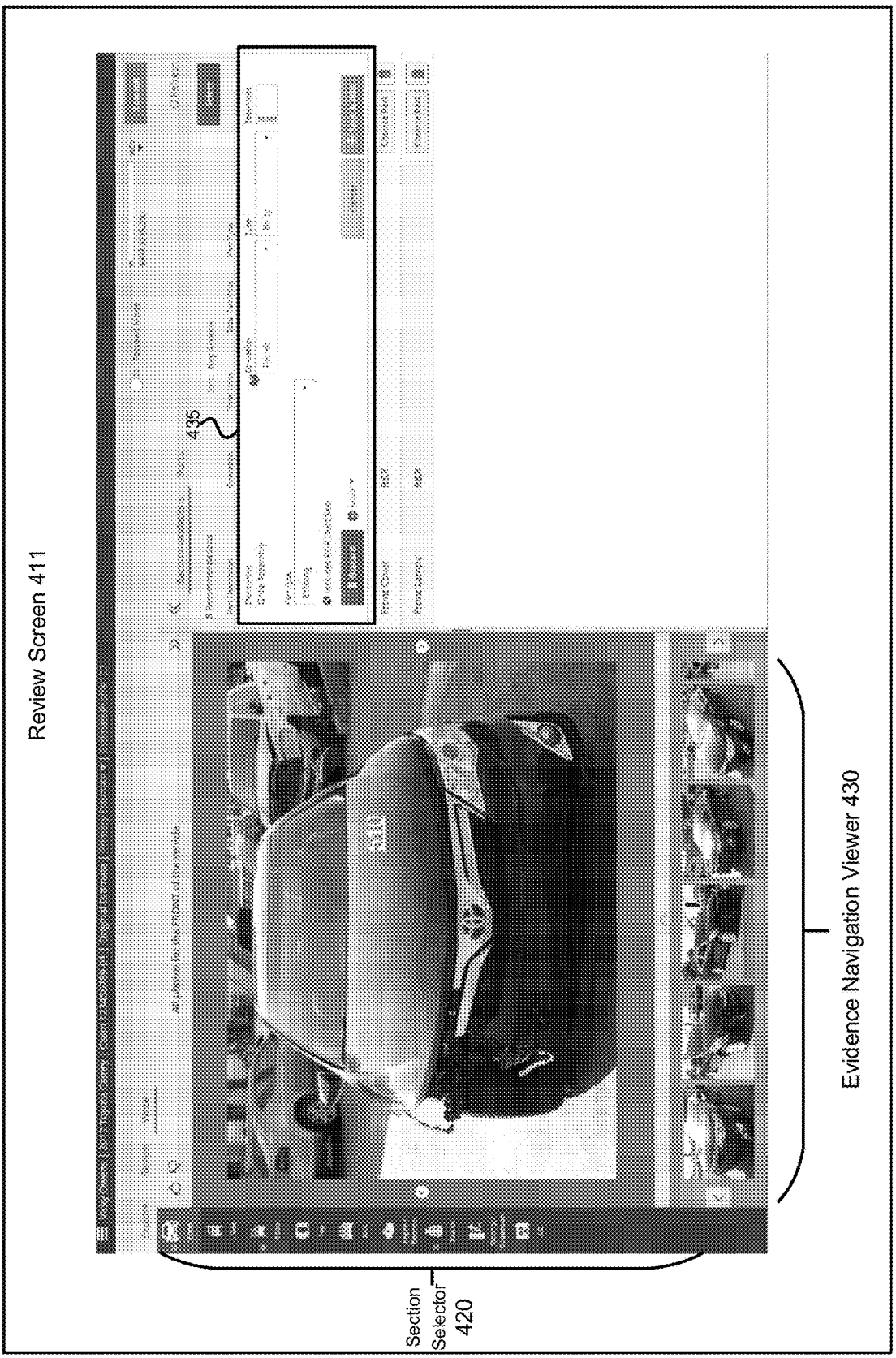

Conversely, at operation 3314, the user may select a specific estimate line, or a specific part, or a specific recommendation which has been presented to the user, from a list of recommendations 410, for example, as illustrated in FIG. 4C. Each recommendation 431, 433 may include information related to the operation recommended to be performed, and so on.

In response, at operation 3310, the appraisal management system may present additional related evidence associated with the specific estimate line, or a specific part, or a specific recommendation selected by the user at operation 3314. Upon reviewing additional evidence, the user may accept recommendations, add additional parts to the repair estimate, and/or edit repair lines previously presented by the appraisal management system. For example, as illustrated in FIG. 4C, a Review screen 411 may be presented to the user within the UI of appraisal management application 124 upon the user selecting a screen indicator 409 in Write Estimate screen 405 illustrated in FIG. 4B. Repair recommendations 410 may be added, edited, or deleted by the user via user edit functions 412. For example, repair recommendation 431 may be added via user edit function 441, while repair recommendation 433 may be edited via user edit function 429. In some embodiments, the recommendations determined to have a higher confidence score and/or based on one or more preconfigured settings by the user may be recommended to be added without further modifications or edits from the user. For example, some recommendations may be added automatically. In other embodiments, the user may edit the recommendation, by accessing the edit screen via user edit function 441. Upon accessing the edit screen illustrated in 4D, the user may modify the information associated with recommendation 435.

In some embodiments, recommendations may be complete or partial such as to assist appraiser while empowering them to remain in total control of the appraisal process. In some embodiments, recommendations may be further manipulated by the user. For example, recommendations may be filtered, sorted and grouped according to multiple dimensions including the section of the vehicle, part type, repair operation, cost, completeness, and confidence score.

In some embodiments, multiple recommendations may be "batch" selected causing multiple recommendations being added simultaneously. By virtue of enabling multiple recommendation addition result in cost reduction and increase in performance efficiency.

In some embodiments, recommendation editor may allow appraisers to provide, or fill-in missing information, prior to adding recommended repair lines to the estimate.

In some embodiments, recommendations may be automatically added to the repair estimate without being reviewed by the appraiser. For example, recommendations related to a particular part or a collection of parts, or a particular labor operation may be configured to be automatically added to the estimate. In some embodiments, recommendations automation thresholds may be configurable to determine level of automation for each part or operation.

Figure 5A:
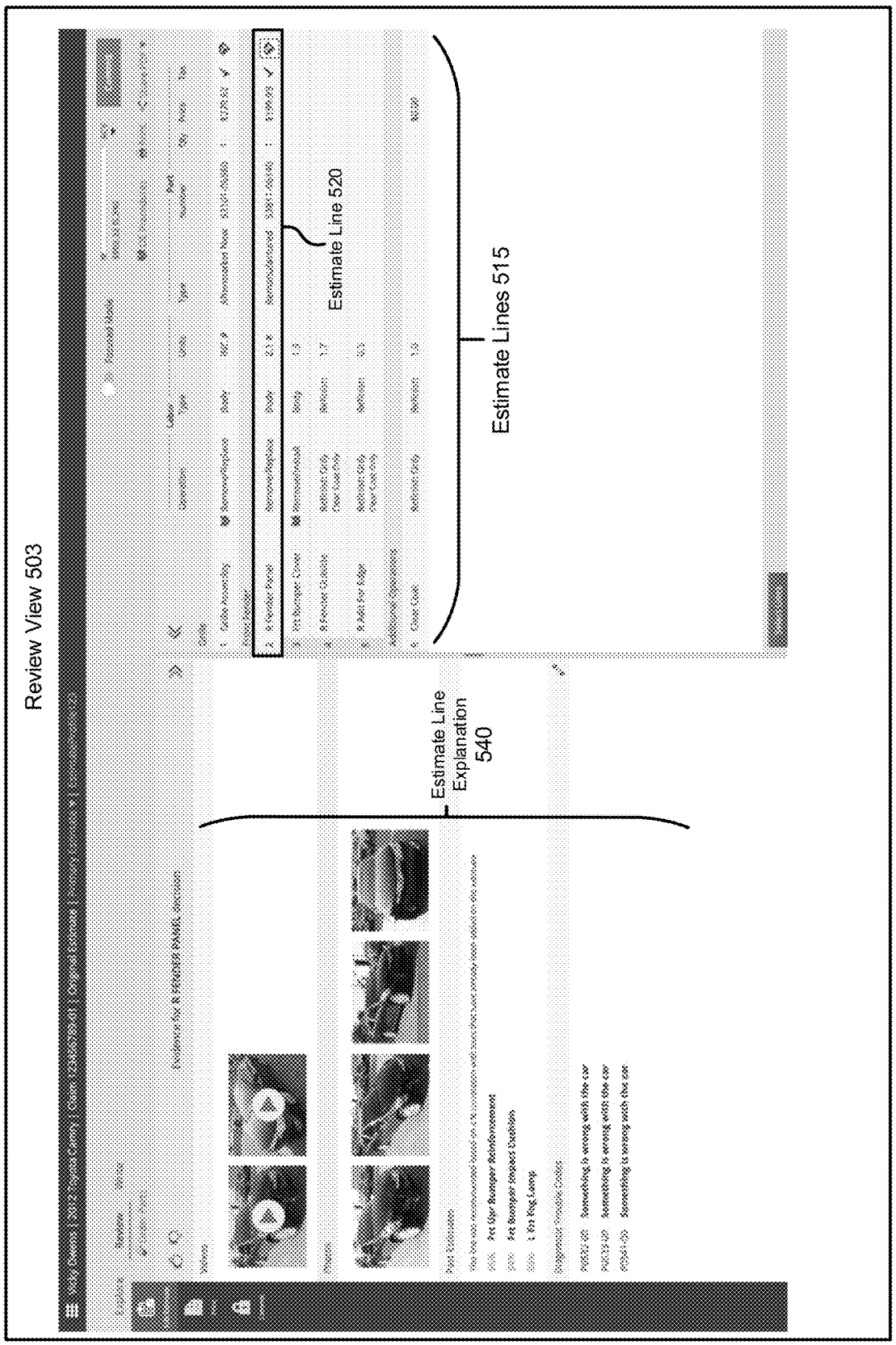
FIG. 5A illustrates an example user interface of the appraisal management system related to reviewing estimate lines, according to an implementation of the disclosure.
Figure 5B:
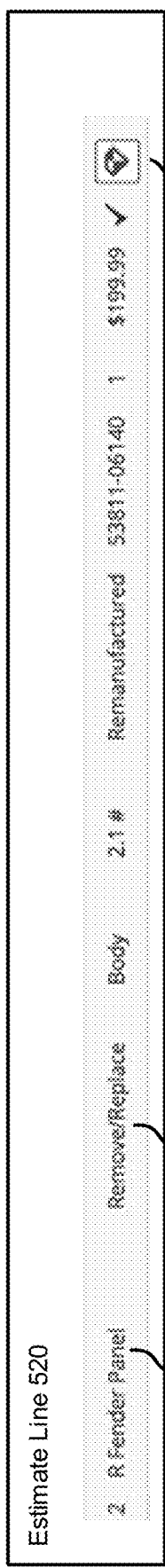
FIG. 5B illustrates an example presentation of an estimate line within the user interface of the appraisal management system, according to an implementation of the disclosure.

In some embodiments, the user may view an explanation upon selecting a recommendation or estimate line. The explanation is evidence which forms the basis of the decision made by the estimate line generating algorithm. In some embodiments, explanation may include damage data used to generate the recommendation (e.g., images and videos), historical estimate data, telematics data, DTC data, and or other such data. Explanations may indicate which panels were detected, what damage was found, which recommended operations are suggested, and other similar information intended to provide transparency behind system decisions and give the appraiser confidence to trust the recommendations generated by the system. For example, as illustrated in FIG. 5A, user may view explanation 540 associated with estimate line 520. For example, as illustrated in FIG. 5B, estimate line 520 may include a panel name 522, an operation 524, and an evidence indicator 526. Upon selecting evidence indicator 526, the user may view estimate line explanation 540 of FIG. 5A.

Referring back to FIG. 3B, at operation 3320, the system may determine that the user accepted recommendations, added additional parts to the repair estimate, and/or edited repair lines upon reviewing additional evidence presented at operation 3310.

Consequently, at operation 3326, the system may add the recommendations, as accepted or edited by the user, including estimates for additional parts to the repair estimate. For example, as illustrated in FIG. 4C, repair recommendations 510 which were added by the user become repair lines 515. In some embodiments, the repair estimate may be generated at the end of the appraisal process and provided to various interested third-parties (e.g., customers, insurance providers, mechanics, and so on).

At operation 3330, the system may use the data as feedback for the AI algorithm and/or machine learning used to generate recommendations.

In contrast, at operation 3324, the user may provide feedback as to why the recommendations generated by the system are not being accepted by the user. For example, the user may indicate that the recommendation is not accurate by selecting a Reason Code for recommendations that they don't accept, user deleting or modifying and/or removing an estimate line which was added automatically Finally, at operation 3328, the system may use the user provided information regarding to not accepting or modifying system generated recommendations as feedback for the AI algorithm and/or machine learning used to generate recommendations.

System Architecture

In some embodiments, appraisal management server 120, vehicle information server 130, damage evidence server 140, and collision repair information server 150 may be a single device. Alternatively, in some embodiments, vehicle information server 130, repair information servers 140, and collision repair information server 150 may include a plurality of devices. For example, the plurality of devices associated with appraisal management server 120, vehicle information server 130, damage evidence server 140, and collision repair information server 150 may be distributed across one or more distinct network computing devices that together comprise one or more appraisal management server 120, vehicle information server 130, damage evidence server 140, and collision repair information server 150.

In some embodiments, appraisal management server 120, vehicle information server 130, damage evidence server 140, and collision repair information server 150 may not be limited to a particular configuration. Thus, in some embodiments, appraisal management server 120, vehicle information server 130, damage evidence server 140, and collision repair information server 150 may contain a plurality of network devices that operate using a master/slave approach, whereby one of the network devices operate to manage and/or otherwise coordinate operations of the other network devices. Additionally, in some embodiments, appraisal management server 120, vehicle information server 130, damage evidence server 140, and collision repair information server 150 may comprise different types of data at different locations.

In some embodiments, appraisal management server 120, vehicle information server 130, damage evidence server 140, and collision repair information server 150 may operate as a plurality of network devices within a cluster architecture, a peer-to-peer architecture, virtual machines, or within a cloud architecture, for example. Thus, the technology disclosed herein is not to be construed as being limited to a single environment and other configurations and architectures are also envisaged.

Although the exemplary network environment 100 with client computing device 104, appraisal management server 120, vehicle information server 130, damage evidence server 140, collision repair information server 150, and network(s) 103 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as client computing device 104, appraisal management server 120, vehicle information server 130, damage evidence server 140, and/or collision repair information server 150 may be configured to operate as virtual instances on the same physical machine. In other words, one or more of client computing device tool 104, appraisal management server 120, damage evidence server 140, and/or collision repair information server 150, may operate on the same physical device rather than as separate devices communicating through communication network(s). Additionally, there may be more or fewer devices than client computing device 104, appraisal management server 120, vehicle information server 130, damage evidence server 140, and/or collision repair information server 150.

In addition, two or more computing systems or devices can be substituted for any one of the systems or devices, in any example set forth herein. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including, by way of example, wireless networks, cellular networks, PDNs, the Internet, intranets, and combinations thereof.

Figure 6:
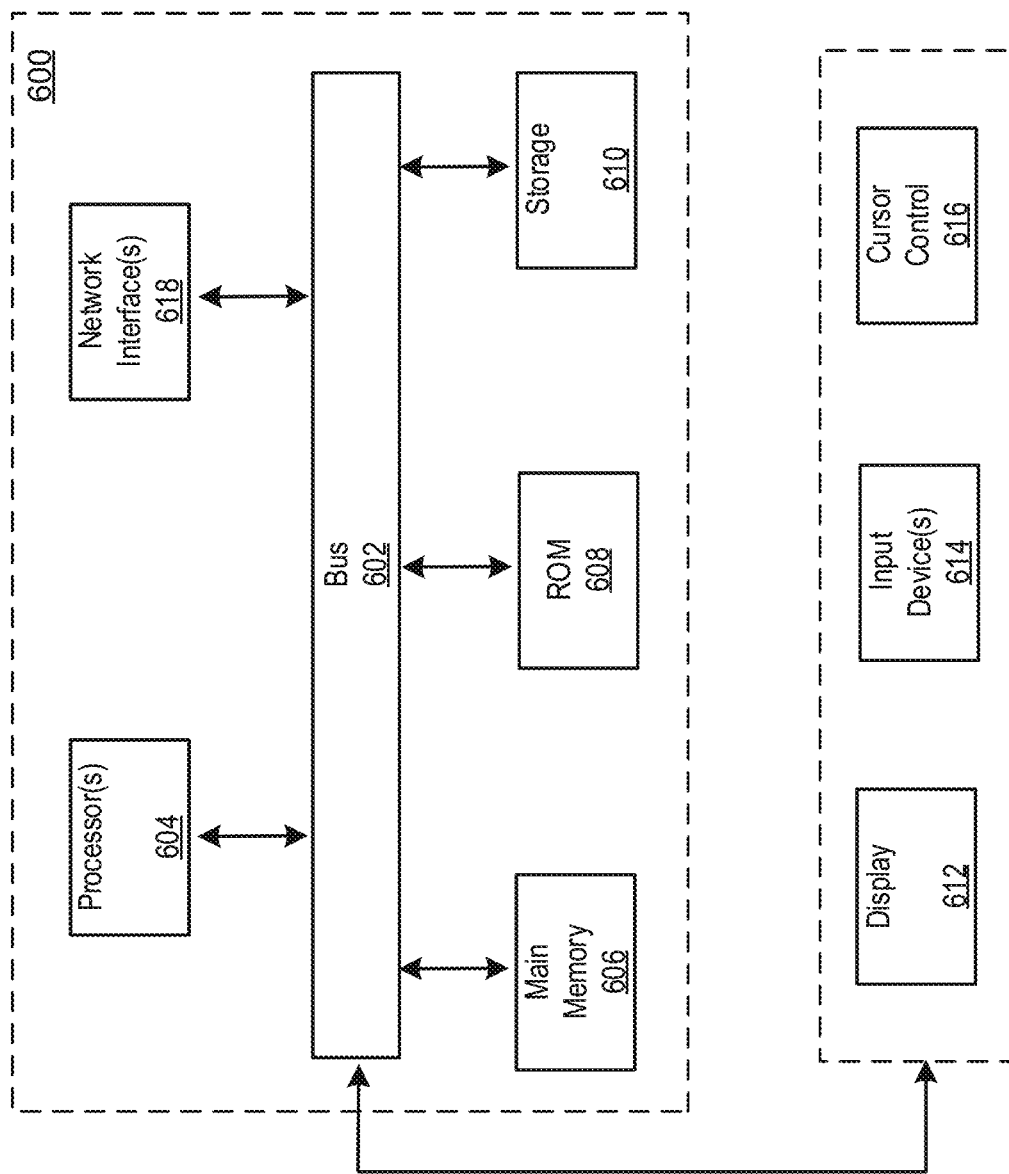
FIG. 6 illustrates an example computing system that may be used in implementing various features of embodiments of the disclosed technology.

Standard System

Where circuits are implemented in whole or in part using software, in one embodiment, these software elements can be implemented to operate with a computing or processing system capable of carrying out the functionality described with respect thereto. One such example computing system is shown in FIG. 6. Various embodiments are described in terms of this example-computing system 600. After reading this description, it will become apparent to a person skilled in the relevant art how to implement the technology using other computing systems or architectures.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a transparent heads-up display (HUD) or an optical head-mounted display (OHMD), for displaying information to a computer user. An input device 614, including a microphone, is coupled to bus 602 for communicating information and command selections to processor 604. An output device 616, including a speaker, is coupled to bus 602 for communicating instructions and messages to processor 604.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 605. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 605. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 602. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for conducting a virtual appraisal, the system comprising:
   a user computing device;
   an appraisal management computing apparatus comprising:
   a processor; and
   a memory storing computer-executable instructions that, when executed by the processor, cause the appraisal management computing apparatus to perform operations comprising:
   receive a plurality of damage evidence files each depicting one or more damaged parts of a vehicle damaged during an adverse incident;
   determine a likelihood of relevance of each damage evidence file to an appraisal of an individual damaged part depicted in the file by using a first machine learning algorithm trained on historic relevance data comprising a plurality of damage evidence files associated with corresponding damaged parts previously identified as relevant;
   present, in a graphical user interface (GUI) of an appraisal application associated with the user computing device, a set of relevant damage evidence files for each damaged part of the vehicle, each of the damage evidence files having the likelihood of relevance exceeding a threshold value;
   generate a first set of training data comprising previously determined repair recommendations for restoring damaged parts;
   train a second machine learning algorithm in a first stage with the first set of training data;
   responsive to a user selection comprising an individual damaged part, present a repair recommendation for restoring the damaged part by using the second machine learning algorithm;
   responsive to the user selection comprising a rejection of the recommendation, generate a second set of training data based on corrections provided by the user, and train the second machine learning algorithm in a second stage with the second set of training data;
   wherein each of the sets of relevant damage evidence files associated with each of the damaged parts is presented upon receiving the user selection comprising a corresponding damaged part of the vehicle; and
   responsive to the user selection comprising an acceptance of the recommendation, generate a repair estimate line.

2. The system of claim 1, the operations further comprising:
   responsive to a user input comprising a selection of the recommendation, present an explanation for the recommendation.

3. The system of claim 2, wherein the explanation comprises a set of damage evidence files used by the second machine learning algorithm during the recommendation determination.

4. The system of claim 1, wherein one set of relevant damage evidence files for one damaged part of the vehicle presented in the GUI of the appraisal application comprises individual evidence files identified by the user as relevant upon reviewing another set of relevant damage evidence files for another damaged part of the vehicle.

5. The system of claim 2, the operations further comprising:
   responsive to a user selection of an individual evidence file associated with a damaged part, present one or more vehicle parts determined to be related.

6. The system of claim 1, wherein the set of relevant files is presented in response to a request to conduct an appraisal of a vehicle damaged during an adverse incident, wherein the request is made by the user.

7. The system of claim 1, wherein the damage evidence files comprise at least one of an image file, a video file, or a 3D scan file.

8. A method comprising:
receiving, by an appraisal management computing apparatus, a plurality of damage evidence files each depicting one or more damaged parts of a vehicle damaged during an adverse incident;
determining, by the appraisal management computing apparatus, a likelihood of relevance of each damage evidence file to an appraisal of an individual damaged part depicted in the file by using a first machine learning algorithm trained on historic relevance data comprising a plurality of damage evidence files associated with corresponding damaged parts previously identified as relevant;
presenting, in a graphical user interface (GUI) of an appraisal application associated with a user computing device, a set of relevant damage evidence files for each damaged part of the vehicle, each of the damage evidence files having the likelihood of relevance exceeding a threshold;
generating a first set of training data comprising previously determined repair recommendations for restoring damaged parts;
training a second machine learning algorithm in a first stage with the first set of training data;
responsive to a user selection comprising an individual damaged part, presenting a repair recommendation for restoring the damaged part by using the second machine learning algorithm;
responsive to the user selection comprising a rejection of the recommendation, generating a second set of training data based on corrections provided by the user, and training the second machine learning algorithm in a second stage with the second set of training data;
wherein each of the sets of relevant damage evidence associated with each of the damaged parts is presented upon receiving the user selection comprising a corresponding damaged part of the vehicle; and
responsive to the user selection comprising an acceptance of the recommendation, generating a repair estimate line.

9. The method of claim 8, responsive to a user input comprising a selection of the recommendation, presenting an explanation for the recommendation.

10. The method of claim 9, wherein the explanation comprises a set of damage evidence files used by the second machine learning algorithm during the recommendation determination.

11. The method of claim 8, responsive to the user selection comprising an acceptance of the recommendation, generating a repair estimate line.

12. The method of claim 8, responsive to the user input comprising a rejection of the recommendation, updating the second machine learning algorithm.

13. The method of claim 8, wherein one set of relevant damage evidence files for one damaged part of the vehicle presented in the GUI of the appraisal application comprises individual evidence files identified by the user as relevant upon when reviewing another set of relevant damage evidence files for another damaged part of the vehicle.

14. The method of claim 8, wherein responsive to a user selection of an individual evidence file associated with a damaged part, presenting one more vehicle parts determined to be related.

15. The method of claim 8, wherein the set of relevant files is presented in response to a request to conduct an appraisal of a vehicle damaged during an adverse incident, wherein the request is made by the user.

16. The method of claim 8, wherein the at least one damage evidence file comprises at least an image file, a video file, a 3D scan file.

17. A non-transitory machine-readable storage medium encoded with instructions executable by one or more hardware processors of a computing component, the machine-readable storage medium comprising instructions to cause the one or more hardware processors to perform operations comprising:
receive a plurality of damage evidence files each depicting one or more damaged parts of a vehicle damaged during an adverse incident;
determine a likelihood of relevance of each damage evidence file to an appraisal of an individual damaged part depicted in the file by using a first machine learning algorithm trained on historic relevance data comprising a plurality of damage evidence files associated with corresponding damaged parts previously identified as relevant;
present, in a graphical user interface (GUI) of an appraisal application associated with a user computing device, a set of relevant damage evidence files for each damaged part of the vehicle, each of the damage evidence files having the likelihood of relevance exceeding a threshold value;
generate a first set of training data comprising previously determined repair recommendations for restoring damaged parts;
train a second machine learning algorithm in a first stage with the first set of training data;
responsive to a user selection comprising an individual damaged part, present a repair recommendation for restoring the damaged part by using the second machine learning algorithm;
responsive to the user selection comprising a rejection of the recommendation, generate a second set of training data based on corrections provided by the user, and train the second machine learning algorithm in a second stage with the second set of training data;
wherein each of the sets of relevant damage evidence files associated with each of the damaged parts is presented upon receiving the user selection comprising a corresponding damaged part of the vehicle; and
responsive to the user selection comprising an acceptance of the recommendation, generate a repair estimate line.

18. The medium of claim 17, the operations further comprising:
responsive to a user input comprising a selection of the recommendation, present an explanation for the recommendation.

19. The medium of claim 18, wherein the explanation comprises a set of damage evidence files used by the second machine learning algorithm during the recommendation determination.

20. The medium of claim 17, the operations further comprising:

responsive to the user selection comprising an acceptance of the recommendation, generate a repair estimate line.

* * * * *